Feb. 24, 1970  M. STAUNT  3,496,638
DENTAL HANDPIECE CONSTRUCTION
Filed July 12, 1967  2 Sheets-Sheet 2
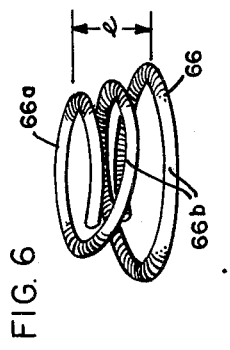
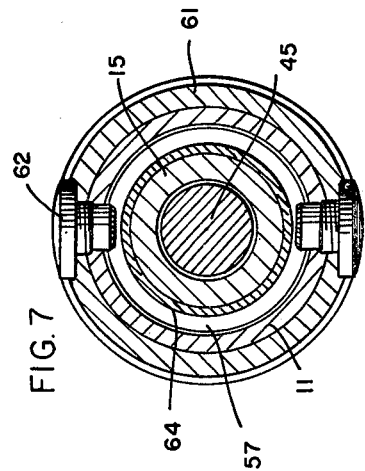
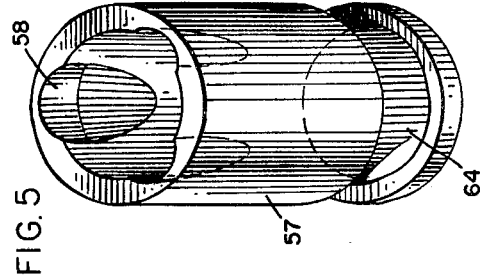
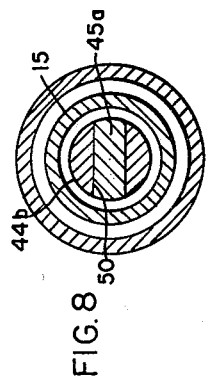
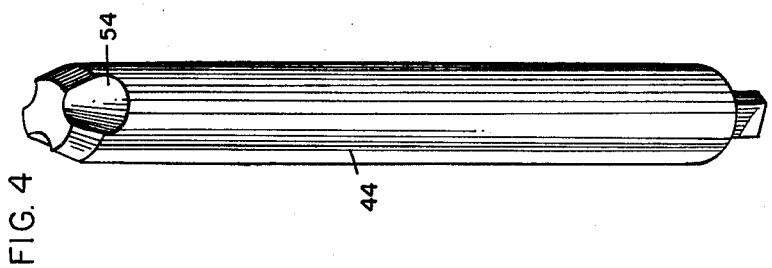
INVENTOR:
MARTIN STAUNT
BY
Dawson, Tilton, Falloy, Lungmus & Alexander
ATT'YS

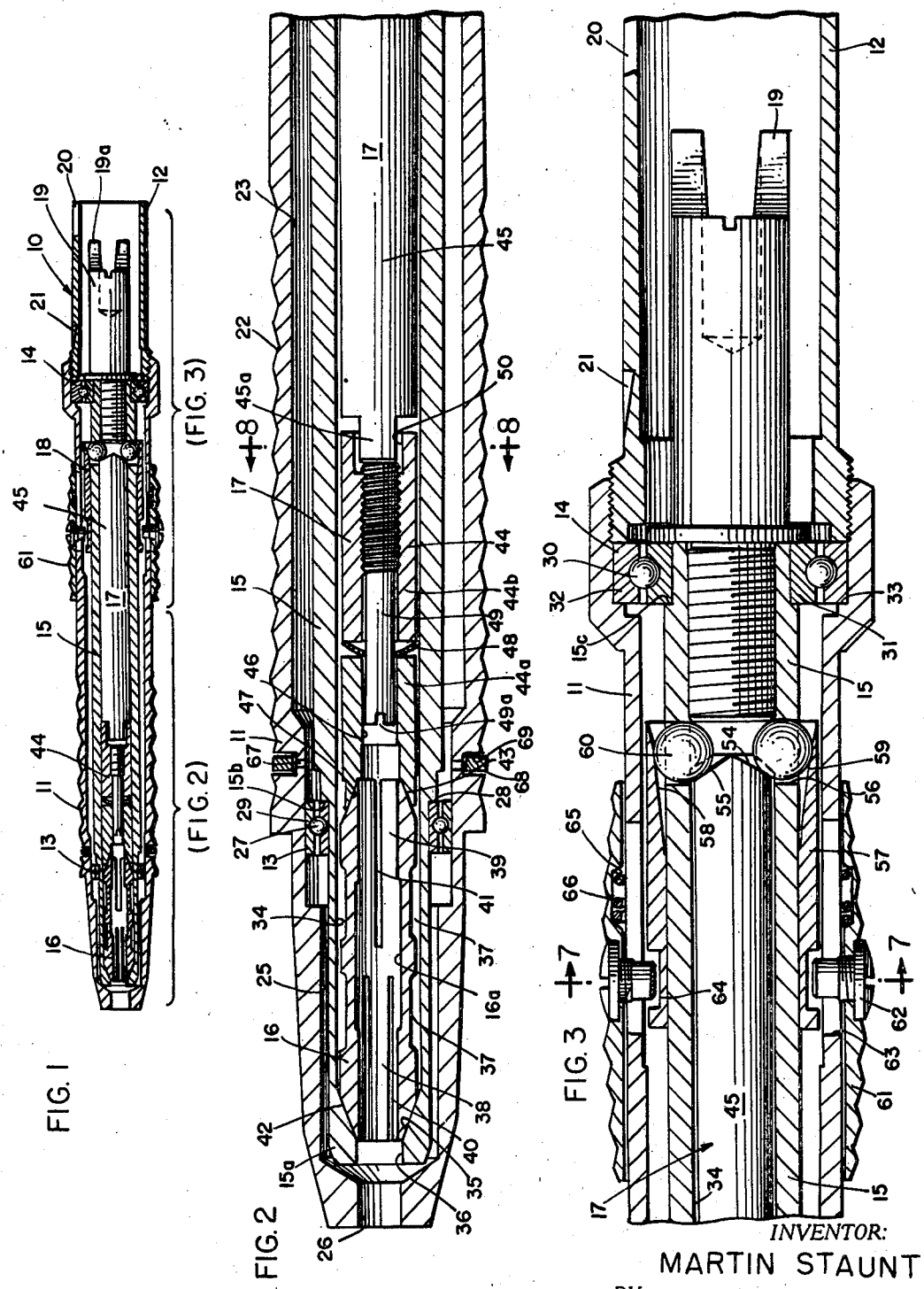

United States Patent Office 3,496,638
Patented Feb. 24, 1970

---

3,496,638
DENTAL HANDPIECE CONSTRUCTION
Martin Staunt, Des Plaines, Ill., assignor to American Hospital Supply Corporation, Evanston, Ill., a corporation of Illinois
Filed July 12, 1967, Ser. No. 652,878
Int. Cl. B23b 31/12, 5/22; B25g 3/02
U.S. Cl. 32—26    6 Claims

ABSTRACT OF THE DISCLOSURE

Dental handpiece having a unitary spindle and a collet-adjusting mechanism which may be easily operated without affecting the length or alignment of the spindle. Received within the spindle is a chuck actuator having ball-receiving cam recesses. Cam balls received in these recesses extend through openings in the spindle and into cam recesses provided in the cylindrical member of a chuck closing assembly extending about the spindle. The chuck actuator, spindle, and cylindrical chuck closing member are connected for common rotational movement by the cam balls, and the chuck actuator may be adjusted for closing (and opening) the collet by axial movement of the chuck closing member with respect to the spindle and the chuck actuator.

BACKGROUND OF THE INVENTION

In my prior Patent 2,432,179, issued Dec. 9, 1947, I disclose a dental handpiece having an adjustable collet-closing mechanism for gripping a dental bur. However, that handpiece includes two spindles for imparting rotational movement to the bur, such spindles being mounted on a total of three bearing assemblies. Adjustment of the collet is accomplished by changing the relative positions of the two spindles and, after a period of extended use and repeated adjustment of the collet, wear of the spindles will cause such spindles to become loose in their mountings. Since modern handpieces of the air-turbine type are generally operated at relatively high rotational speeds, some being operated well in excess of one hundred thousand revolutions per minute, any loseness or improper alignment of the rotating parts may cause extreme vibration and rapid breakdown.

SUMMARY OF THE INVENTION

In the handpiece of the present invention only a single integral spindle is used, such spindle being rotatably supported by front and rear bearing assemblies. The entire collet-adjusting operation occurs between these assemblies without any axial movement or displacement of the spindle itself. As a result, precise alignment of the spindle is at all times accurately maintained. The collet may be quick and easily adjusted by simply shifting an adjustment sleeve which constitutes a part of the chuck closing assembly and which is located about the outer sheath or casing of the handipece. The adjustment sleeve is operatively connected to a chuck actuator disposed within the spindle, the chuck actuator in turn cooperating with a collet to cause the slotted tapered jaws of the collet to close and open for selectively gripping and releasing a dental bur. Despite the provision of an external adjustment sleeve for adjusting the internally-disposed collet, such sleeve, which does not rotate during handpiece operation, does not interfere with the high-speed rotation of the spindle and bur because of spring means for automatically shifting the slide into a neutral position after collet adjustment has been effected.

DRAWINGS

FIGURE 1 is a cross sectional view of a handpiece embodying the present invention;

FIGURE 2 is an enlarged fragmentary cross sectional view of part of the structure illustrated in FIGURE 1;

FIGURE 3 is an enlarged fragmentary sectional view of the remaining part of the structure illustrated in FIGURE 1;

FIGURE 4 is a perspective view of a chuck actuator;

FIGURE 5 is a perspective view of the slidable chuck closing member;

FIGURE 6 is a perspective view of the return spring which constitutes a component of the chuck closing assembly;

FIGURE 7 is a sectional view taken along line 7—7 of FIGURE 3;

FIGURE 8 is a transverse sectional view taken along line 8—8 of FIGURE 2.

DESCRIPTION OF THE DRAWINGS

Referring to FIGURE 1, the numeral 10 generally designates a dental handpiece which, in the illustration given, comprises an attachment for a conventional power unit or driver (not shown). Since the driving unit constitutes no part of the present invention, a detailed disclosure thereof is believed unnecessary herein. It is to be understood, however, that the structure of the present invention may if desired constitute one portion of a unitary handpiece which includes as the other portion thereof an integral driving assembly containing an air turbine or other driving means.

Handpiece 10 includes a generally cylindrical outer sheath or housing 11 and a slip-joint sleeve 12 coaxial with and threadedly received within one end of the sheath. Bearing assemblies 13 and 14 in the front and rear portions of the sheath rotatably support opposite end portions of a unitary spindle 15. A collet 16 is disposed within the front portion of the hollow cylindrical spindle and a segmented chuck actuator 17 extends rearwardly through the spindle from the collet to the spindle's rear end. About the spindle's intermediate portion is a tubular chuck-closing member 18. A cylindrical driving dog 19 is coaxial with the spindle and is threadedly connected to the spindle at the rear end thereof. The driving dog is disposed within the slip-joint sleeve 12 and, as shown in FIGURE 1, is provided with teeth 19a for disconnectably engaging the corresponding teeth of a suitable driving member (not shown). The slip-joint sleeve is provided with a rectangular slot 20 and a triangular slot 21 for engaging lugs on a standard housing provided by the driving assembly (not shown).

Referring now to FIGURE 2, it will be seen that the intermediate portion of the sheath is knurled as at 22 so that it may be conveniently and securely gripped by a dentist or other operator. The sheath has an axially extending bore 23 through which the spindle 15 extends, the bore having a forward portion 25 of reduced diameter disposed forwardly of front bearing assembly 13. An opening 26 at the front end of the sheath is coaxial with bore 23 and communicates with that bore for inserting the end of a dental bur into collet 16.

Front bearing assembly 13 comprises a plurality of ball bearings 27 carried between inner and outer bearing races 28 and 29. The outer race fits tightly against the inner surface of the sheath's bore 23 and, in the illustration given, the inner race is press fitted upon the reduced forward portion 15a of the spindle against annular shoulder 15b. Rear bearing assembly 14 similarly includes a plurality of ball bearings 30 carried between inner and outer races 31 and 32, the inner race bearing against perimetric shoulder 15c of the spindle and the outer race being seated against internal shoulder 33 of the sheath. It will also be observed that the outer race 32, and thus the rear bearing assembly as a whole, is locked in place because of engagement by the threaded end of slip-joint sleeve 12 (FIGURE 3).

As shown in FIGURE 2, spindle 15 is provided with a longitudinally extending cylindrical bore 34 which tapers forwardly and inwardly near the front end of the spindle to define a conical collet camming surface 35. The bore terminates in a front opening 36 which is approximately the same size, or slightly larger than, the coaxial sheath opening 26 immediately adjacent thereto.

Collet 16 is slidably received within the front portion of bore 34 and, as shown clearly in FIGURE 2, is generally cylindrical in shape and is provided with a central bore 16a extending axially therethrough. If desired, the intermediate portion of the collet may be provided with circumferentially extending clearance grooves or recesses 37, thereby reducing the area of surface contact between the collet and the spindle as well as increasing the flexibility of spring fingers 38 and 39. The flexible fingers or jaws 38 at the front end of the collet are defined by a plurality of axially extending and circumferentially spaced slots 40 leading inwardly from the front end of the collet, whereas the rear spring fingers 39 are defined by similar slots 41 extending inwardly from the collet's rear end. At its front and rear ends, the collet is tapered to provide conical bearing surfaces 42 and 43, the front bearing surface 42 having approximately the same slope as the camming surface 35 of the spindle and being slidably engageable therewith.

The actuator 17 for the chuck or collet 16 is disposed directly behind the collet and is slidably disposed within the bore 34 of the spindle. While the cylindrical chuck actuator may constitute a single member, it is desirable to segment such actuator into front and rear portions 44 and 45, respectively. The front portion 44 is provided with an axial bore 46 and with a forwardly and outwardly tapered conical surface 47 which receives and slidably engages the tapered rear end portion of collet 16.

In the illustration given, the front portion 44 of the chuck actuator is in turn divided into front and rear sections 44a and 44b, respectively, and an annular spring element 48 is interposed between the sections to cushion vibrations and prevent the possibility of loosening of the collet during certain dental operations, such as those performed with relatively large burs of substantial diameter at their cutting surfaces. A threaded screw or rod 49 extends through bore 46 and, as shown in FIGURE 2, is threadedly received within the portion of the bore in section 44b. The forward end of the screw is notched at 49a to receive the tip of a screwdriver for adjustment of the parts as will be described hereinafter.

The rear end of rear section 44b is cut to define a transverse recess 50, as most clearly seen in FIGURES 2 and 8, and this recess slidably receives a forward extension 45a of chuck actuator portion 45. The forwardly projecting nose or extension bears against the rear end of screw 49, so that by rotating the screw the length of the segmented chuck actuator is increased or decreased. Since nose 45a and recess 50 are non-circular in cross section, the two portions 44 and 45 of the chuck actuator are effectively locked against independent relative rotation.

Referring now to FIGURES 3 and 4, it will be observed that the rear end of the chuck actuator 17 is provided with a plurality of circumferentially spaced ball-receiving recesses 54 having inclined cam surfaces 55. Specifically, cam surfaces 55 extend radially and slope outwardly and forwardly at included angles of more than 45 degrees with respect to the axis of the actuator 17. In the illustration given, three equally spaced recesses 54 are provided but it will be understood that a greater or smaller number may also be used.

The wall of the spindle 15 extending about the rear end of the chuck actuator and about cam recesses 54 is provided with a plurality of openings 56, each of the circumferentially spaced openings being radially aligned with one of the cam recesses 54. A tubular chuck closing member or sleeve 57 is slidably disposed about the rear portion of the spindle 15 in front of the openings 56 and, as illustrated most clearly in FIGURE 5, has plurality of inwardly and rearwardly facing recesses 58, each recess 58 being radially aligned with a spindle opening 56 and a cam recess 54. It will be observed that the bottom surfaces of recesses 58 slope gradually outwardly at an angle substantially less than 45 degrees with respect to the rotational axis of the spindle, the preferred angle being within the range of approximately 5 to 15 degrees.

Positioned between each recess 58 of the chuck closing member 57 and each cam recess 54 of the chuck actuator, and thereby disposed within each spindle opening 56, is a cam member 60. In the illustration given, the cam members comprise a plurality of balls carried within spindle openings 56. The circumferential dimension of each opening 56 is only slightly greater than the diameter of the cam ball 60 received therein and, since the ball is seated within the opposing recesses 55 and 59 of chuck actuator 17 and chuck closing member 57, it is believed apparent that the multiple cam balls 60 lock the actuator 17, spindle 15, and chuck closing member 57 against independent relative rotation. Thus, when connector 19 of the hand piece is rotated, the spindle 15, chuck actuator 17, cam balls 60, chuck closing member 57, and collet or chuck 16 all rotate in unison.

Since each of the camming balls 60 has a diameter smaller than the maximum radius of recess 58 (as measured to the rotation axis of the chuck closing member 57), each camming ball is capable of limited radial movement within its spindle opening 56. As the chuck closing member 57 is shifted rearwardly from the position shown in FIGURE 3, the multiple camming balls 60 will be cammed inwardly towards the rotational axis of the spindle, the balls rolling or sliding radially inwardly along the sloping cam surfaces 55 of the chuck actuator 17. As previously described, such surfaces 55 extend inwardly and rearwardly, and since rearward movement of the cam balls 60 is blocked by the rear limits of openings 56, the chuck actuator 17 must shift axially forwardly to accommodate the inwardly displaced cam balls 60. Conversely, when sleeve 57 is shifted forwardly, cam balls 60 are free to move outwardly and thereby permit rearward axial displacement of the chuck actuator 17.

Slidably mounted about the outer surface of the sheath 11 is an adjustment sleeve 61 which has a knurled outer surface and which is provided with elements 62 projecting inwardly through longitudinally elongated openings 63 in the sheath. In the embodiment illustrated in the drawings, elements 62 consist of screws threadedly secured to the sheath at diametrically opposite sides thereof, the inner ends of the screws projecting inwardly beyond the inner surface of the sheath. As shown in FIGURES 3 and 7, the chuck closing member 57 is provided with an annular external groove 64 which has axial dimensions substantially greater than the diameter of the inner end portions of screws 62. It will also be noted that the inner ends of the screws terminate short of the bottom of annular groove 64 and, therefore, that the screws will engage the chuck closing member 57 only when the parts are moved axially to bring the ends of the screws into engagement with the side walls of groove 64. Furthermore, it will be observed that the length of the longitudinally elongated openings 63 is such that even when screws 62 and the cam closing member 57 are in their forwardmost positions, cam balls 60 will still be retained between cam recesses 54 and 58. Since the width of openings 63 is only slightly greater than the diameter of screws 62, the screws effectively hold the adjustment sleeve 61 against relative rotation upon sheath 11 without preventing axial movement of the parts within the limits of openings 63.

Referring now to FIGURES 3 and 6, the adjustment sleeve 61 is provided with an annular inwardly facing recess 65. Disposed within that recess and extending about the outer surface of sheath 11 is a helical multiple-coil reset spring 66. The axial dimension of the spring in its untensioned state (dimension "*l*" in FIGURE 6) is approximately the same as the longitudinal dimension of recess 65 and the internal diameter of the rear end coil 66a of the spring (in an untensioned state) is slightly less than the external diameter of sheath 11. Thus, when the spring is mounted as shown in FIGURE 3, it frictionally grips the outer surface of the sheath to hold the adjustment sleeve 61 in a selected position of adjustment thereon. The remaining coils 66b of the reset spring in front of coil 66a are preferably of larger internal diameter than sheath 11, as indicated in FIGURES 3 and 6.

Since the rear end of spring 66 frictionally grips the outer surface of the sheath, substantial movement of the adjustment sleeve 61 in either direction is accomplished only by overcoming the frictional resistance between the spring and the sheath. When such resistance is overcome, and the sleeve 61 is moved in a rearward direction to tighten the collet 16, spring 66 will tend to be axially compressed, since the frictional resistance between the spring and the sheath is greater than the resistance of the spring to flexure. After the adjustment sleeve is rearwardly shifted and then released, spring 66, in returning to its original uncompressed state, will automatically shift the adjustment sleeve a short distance in reverse direction until the axial spring tension is relieved.

At the forward end of sheath 11 is an oil port 67 extending radially through the wall of the sheath near front bearing assembly 13 and adjacent the engagement between collet 16 and chuck actuator 17. A split ring 68, rotatably carried in annular sheath groove 69, may be turned to expose and conceal the oil port as desired.

OPERATION

When it is desired to use handpiece 10, a bur is inserted through sheath opening 26 and spindle opening 36 into the bore of collet 16. The bur is then secured within the collet by axially moving the adjustment sleeve 61 rearwardly or to the right as shown in FIGURE 3. Such movement of the sleeve brings the ends of screws 62 to engagement with the rear side surface of annular groove 64 of the chuck closing member 57, and continued rearward movement of the adjustment sleeve forces the chuck closing member to the right to urge camming balls 60 inwardly. Inward movement of the caming balls (which are blocked against rearward movement by the limits of spindle openings 56) cams the chuck actuator rod 17 forwardly so that cam surfaces 47 at the forward end of that rod forceably engage the opposing cam surfaces 47 of collet 16. Continued forward movement of the chuck actuator drives the collet forwardly to cause an inward camming of the flexible fingers or jaws 38 and 39 at the front and rear ends of the collet. Therefore, by shifting the adjustment sleeve 61 rearwardly, the jaws of the collet are closed about the shank of the dental bur (not shown) to firmly secure that bur to the collet and indirectly to the spindle.

When the operator has thus locked a bur within the jaws of the collet and releases the adjusting sleeve 61, the axially compressed return spring 66 will shift the adjustment sleeve a slight distance forwardly, thereby relieving the tension of the spring and, in so doing, shifting the inner ends of screws 62 into central positions within annular groove 64 of the collet closing member 57. The screws are thereby moved out of contact with the rearward wall of the annular groove 64 of the chuck closing member and do not interfere with, or impose any resistance to, rotational movement of the spindle 15 during subsequent operation of the handpiece.

The entire chuck closing operation is carried out within a single unitary spindle which is mounted with a high degree of stability between front and rear bearing assemblies. Precise alignment of the rapidly rotating or rotatable spindle is at all times maintained, thereby eliminating or greatly reducing spindle vibration and the wear and breakdown which might otherwise result.

When it is desired that the bur be removed, the adjustment sleeve 61 is simply shifted forwardly or to the left as shown in FIGURE 3, and the forward force exerted on the collet 16 and collet or chuck actuator 17 is thereby relieved. The resilience of collet jaws 38 and 39 causes such jaws to spread outwardly, releasing the bur, and at the same time shifting the actuator 17 a short distance rearwardly into the space formerly occupied by the outwardly displaced cam balls 60.

Occasional adjustment of the length of the chuck actuator 17 may be desired in order to maintain proper operation of the chuck closing mechanism within the range of movement permitted by sleeve 61. Such adjustment is achieved simply by inserting the end of a screwdriver into the front portion of the handpiece to rotate screw 49 while at the same time holding the chuck actuator 17 against rotation by means of a suitable tool engaging dog 19 at the handpiece's rear end.

In the particular illustration given, the sloping surfaces of recesses 58 have a double slope. The major portion 58a of each bottom surface has a slope within the range of about 5 to 10 degrees with relation to the spindle axis (5 degrees shown) whereas the most rearward portion 58b of each recess adjacent the rear end of the chuck closing member has a slope within the range of about 10 to 15 degrees (15 degrees shown). As a result, only a relatively short distance of rearward movement of sleeve 61 and member 57 is necessary in order to urge balls 60 inwardly a distance sufficient to shift the chuck actuator 17 into engagement with the collet 16 and the collet into engagement with a dental bur. The real tightening action occurs thereafter, with balls 60 engaging the more gradually inclined surfaces 58a of the recesses. Because of the gradual taper, a greater mechanical advantage works in favor of the operator and a secure clamping of the dental bur is achieved with relatively slight rearward force exerted on sleeve 61.

While in the foregoing specification a detailed description of the preferred embodiment of the invention has been set forth for purposes of illustration, it is to be understood that many of the details given herein may be varied by those skilled in the art without departing from the spirit and scope of the invention.

I claim:
1. In a dental handpiece,
   (a) an outer sheath;
   (b) an integral elongated spindle rotatably mounted within said sheath by front and rear bearing assemblies, said spindle being provided with a longitudinally extending bore and having a radially inwardly extending collet-camming surface adjacent the front end of said spindle;
   (c) a collet slidably disposed within said spindle adjacent the front end thereof, said collet being provided with a central bur-receiving bore and having spring jaws engageable with said collet-camming surface for inward flexing movement when said collet is urged forwardly within said spindle;
   (d) chuck actuator means slidably disposed within said spindle behind said collet, said chuck actuator means having a rear end portion thereof provided with a plurality of recesses defining inwardly and rearwardly angled cam surfaces;
   (e) a plurality of cam balls disposed in openings provided in said spindle about said recesses and engaging said cam surfaces of said chuck actuator means to cam said actuator means forwardly when said balls are urged inwardly, said balls being confined by said recesses against circumferential movement relative to said chuck actuator means and thereby locking said spindle and chuck actuator means against independent relative rotation;
   (f) and means carried by said spindle and sheath for forcing said cam balls inwardly along the cam surfaces of said chuck actuator means for urging said chuck actuator means forwardly to close said collet jaws.

2. The structure of claim 1 in which said last-mentioned means comprises a chuck closing assembly, said assembly including an annular chuck closing member slidably mounted upon the rear portion of said spindle and locked against independent rotation thereon, said chuck closing member being engageable with said cam balls for urging said balls inwardly when said chuck closing member is urged in one axial direction and for releasing said balls for outward movement when said member is urged in the opposite axial direction, a collet-adjusting sleeve slidably mounted about said sheath and fixed against relative rotation thereon, and means coupling said sleeve and chuck closing member for simultaneous axial movement, said chuck closing member being provided with a pluraltiy of recesses having cam surfaces engageable with said balls, each of said cam surfaces extending outwardly from the axis of said member at an angle within the range of about 5 to 15 degrees.

3. In a dental handpiece, an outer sheath, an integral elongated spindle rotatably mounted within said sheath by front and rear bearing assemblies, said spindle being provided with a longitudinally extending bore and having a radially inwardly extending collet-camming surface adjacent the front end of said spindle, a collet slidably disposed within said spindle adjacent the front end thereof, said collet being provided with a central bur-receiving bore and having spring jaws engageable with said collet-camming surface for inward flexing movement when said collet is urged forwardly within said spindle, chuck actuator means slidably disposed within said spindle behind said collet, said chuck actuator means having a rear end portion thereof provided with a plurality of recesses defining inwardly and rearwardly angled cam surfaces, a plurality of cam balls disposed in openings provided in said spindle about said recesses and engaging said cam surfaces of said chuck actuator means to cam said actuator forwardly when said balls are urged inwardly, and means carried by said spindle and sheath for forcing said cam balls inwardly along the cam surfaces of said chuck actuator means for urging said chuck actuator means forwardly to close said collet jaws, said last-mentioned means comprising a chuck closing assembly including an annular chuck closing member slidably mounted upon the rear portion of said spindle and locked against independent rotation thereon, said chuck closing member being engageable with said cam balls for urging said balls inwardly when said chuck closing member is urged in one axial direction and for releasing said balls for outward movement when said member is urged in the opposite axial direction, a collet-adjusting sleeve slidably mounted about said sheath and fixed against relative rotation thereon, and means coupling said sleeve and chuck closing member for simultaneous axial movement comprising at least one inwardly projecting element provided by said sleeve and received within an annular groove extending about the outer surface of said chuck closing member, said annular groove having an axial dimension substantially greater than the axial dimension of said element, and spring means interposed between said sleeve and sheath for urging the inwardly projecting element of said sleeve into a position intermediate the axial limits of the annular groove of said chuck closing member.

4. The structure of claim 3 in which said spring means comprises a helical spring extending about and friction ally engaging the outer surface of said sheath, said spring being disposed within an inwardly facing annular recess provided in said sleeve, the axial dimension of said recess approximating the axial dimension of said spring in an untensioned state, and the frictional resistance between said spring and said sheath exceeding the expansive force of said spring, whereby, axial movement of said sleeve in one direction causes compression of said spring, the expansive force of said spring urging said sleeve a slight distance in a reverse direction upon the release of manual adjusting forces applied to said sleeve.

5. The structure of claim 4 in which the difference in length of the spring between its fully compressed and its untensioned states is less than the difference between the axial dimensions of said inwardly extending element and the annular groove of said chuck closing member.

6. The structure of claim 2 in which each of said cam surfaces of said chuck closing member has a double slope, a first portion of said slope having an angle greater than 10 degrees measured from the axis of said member for camming said balls inwardly a relatively great distance during initial movement of said chuck closing member in said one direction and a second portion of said slope having an angle less than 10 degrees for camming said balls inwardly a relatively slight distance during final adjustment of said chuck closing member in said one direction.

References Cited
UNITED STATES PATENTS

| | | | |
|---|---|---|---|
| 577,063 | 2/1897 | Pedersen | 32—26 |
| 1,741,734 | 12/1929 | Pannwitz | 32—26 X |
| 2,432,179 | 12/1947 | Staunt | 32—26 |

FOREIGN PATENTS

| | | |
|---|---|---|
| 1,007,255 | 2/1952 | France. |
| 280,580 | 5/1952 | Switzerland. |

ROBERT C. RIORDON, Primary Examiner

U.S. Cl. X.R.

279—51, 54